(12) United States Patent  (10) Patent No.: US 7,445,387 B2
Iguchi  (45) Date of Patent: Nov. 4, 2008

(54) BALL BEARING

(75) Inventor: Kaoru Iguchi, Tokyo (JP)

(73) Assignee: Iguchi Kiko Co., Ltd. (JP)

( * ) Notice: Subject to any disclaimer, the term of this patent is extended or adjusted under 35 U.S.C. 154(b) by 104 days.

(21) Appl. No.: 11/371,593

(22) Filed: Mar. 9, 2006

(65) Prior Publication Data

US 2006/0188183 A1  Aug. 24, 2006

Related U.S. Application Data

(63) Continuation of application No. PCT/JP2004/013590, filed on Sep. 10, 2004.

(30) Foreign Application Priority Data

Sep. 12, 2003  (JP) .............................. 2003-322045

(51) Int. Cl.
*F16C 29/04* (2006.01)
*B65G 13/00* (2006.01)
(52) U.S. Cl. ...................... 384/49; 193/35 A
(58) Field of Classification Search ............ 384/41–49, 384/55, 245, 521, 610; 193/41, 35 M, 35 MD, 193/35 A; 16/26; 280/843
See application file for complete search history.

(56) References Cited

U.S. PATENT DOCUMENTS

| 616,411 | A | * | 12/1898 | Dimmitt ........................ 16/26 |
| 1,616,442 | A | * | 2/1927 | De Festenburg et al. .... 280/843 |
| 1,963,956 | A | * | 6/1934 | Craig ........................... 193/41 |
| 2,723,169 | A | * | 11/1955 | Petit ............................ 384/512 |
| 4,689,847 | A | * | 9/1987 | Huber ........................... 16/26 |
| 4,778,041 | A | * | 10/1988 | Blaurock ............... 193/35 MD |
| 5,096,308 | A | * | 3/1992 | Sundseth ..................... 384/49 |
| 5,106,207 | A | * | 4/1992 | Fry .............................. 384/49 |
| 5,219,058 | A | * | 6/1993 | Sundseth ............... 193/35 MD |
| 5,358,337 | A |   | 10/1994 | Codatto ....................... 384/41 |
| 5,464,086 | A | * | 11/1995 | Coelln ................... 193/35 MD |
| 5,516,211 | A | * | 5/1996 | Barnes et al. ................. 384/49 |
| 5,538,346 | A | * | 7/1996 | Frias et al. .................... 384/49 |

(Continued)

FOREIGN PATENT DOCUMENTS

JP  48088341  11/1973

(Continued)

OTHER PUBLICATIONS

International Search Report dated Dec. 13, 2004, 2 pages.

(Continued)

*Primary Examiner*—Marcus Charles
(74) *Attorney, Agent, or Firm*—St. Onge Steward Johnston & Reens LLC

(57) ABSTRACT

A ball bearing includes a ball supporting member having a hemispherical concave surface, small balls freely disposed on the hemispherical concave surface, a large ball disposed on the small balls so as to be rotatable in all directions, and a casing that has an aperture through which an upper portion of the large ball projects, the casing accommodating the ball supporting member, the small balls, and the large ball; the small balls include primary small balls contacting the large ball so as to support the large ball, and auxiliary small balls, which are smaller than the primary small balls, for supporting the large ball and not contacting the large ball.

5 Claims, 3 Drawing Sheets

U.S. PATENT DOCUMENTS 5,549,331 A * 8/1996 Yun et al. .................. 280/843
6,814,212 B1 * 11/2004 Ebersole .................. 193/35 R

FOREIGN PATENT DOCUMENTS

| JP | 53033760 | 3/1978 |
| JP | 63-180718 | 7/1988 |
| JP | 5083449 | 11/1993 |
| JP | 10-120129 | 5/1998 |
| JP | 10-252753 | 9/1998 |
| JP | 2003-184871 | 7/2003 |
| JP | 20031184871 | 7/2003 |

OTHER PUBLICATIONS

Japanese Office Action, Jul. 28, 2006, 4 pages.

* cited by examiner

Prior Art

BALL BEARING

CROSS-REFERENCE TO RELATED APPLICATIONS

This application is a continuation of international patent application PCT/JP2004/013590 filed Sep. 10, 2004 which designates the Unites States and which claims priority from Japanese Patent Application No. 2003-322045, filed Sep. 12, 2003, the content of which is incorporated herein by reference.

FIELD OF THE INVENTION

The present invention relates to a ball bearing that is structured so that conveyed products and the like are directly loaded on a single ball that rotates freely in all directions and that is advantageously used in product conveying apparatuses and the like.

BACKGROUND OF THE INVENTION

An example of a conveying apparatus, which conveys materials, parts, semi-finished products, finished products, and other such products in a production facility or the like, is one in which a ball bearing (it is also referred to as "ball transfer"), which is structured so as to provide one ball that rotates freely in all directions and is in direct contact with the conveyed products, is arranged in plurality, and thereby products are conveyed by being smoothly slid. Although this type of ball bearing has various uses, the ball bearing generally has the structure of the ball bearing 1 shown in FIG. 3. In this structure, the ball supporting member 2 has a hemispherical concave surface 2a on which a plurality of small balls 3 is freely arranged. One large ball 4 is seated thereon, and the large ball 4 is retained so as to be rotatable in all directions. All of these components are accommodated inside a casing 5, which has an aperture 5a through which the upper portion of the large ball 4 projects.

In this type of ball bearing 1, it is assumed that in order for the large ball 4 to be able to rotate smoothly without resistance, it is necessary that the plurality of small balls 3 supporting the large ball 4 all have an identical diameter to a high precision. Therefore, in the conventional ball bearing 1, as illustrated in the figure, all of the small balls 3 have an identical diameter.

There are various environments in which the ball bearing 1 may be used. Because these environments are not limited to those free of contaminants, contaminants may penetrate inside the ball bearing. When this occurs, the contaminants adhere to the small balls 3, the smoothness of the rotation of the small balls 3 deteriorates, the smoothness of the rotation of the large ball 4 deteriorates, and thereby the performance as a ball bearing degrades. In addition, the smoothness of the rotation of the large ball 4 deteriorates when contaminants adhere directly to the large ball 4 or when contaminants become interposed between the large ball 4 and the small balls 3.

SUMMARY OF THE INVENTION

In order to solve the problems described above, the present invention provides a ball bearing that includes a bearing supporting member that has a hemispherical concave surface, a plurality of small balls disposed freely on the hemispherical concave surface, one large ball retained on the plurality of small balls so as to be rotatable in all directions, and a casing having an aperture through which the upper portion of the large ball projects, the casing accommodating the ball supporting member, the small balls, and the large ball; the small balls include primary small balls contacting the large ball so as to support the large ball, and auxiliary small balls, which are smaller than the primary small balls, for supporting the large ball and not contacting the large ball.

According to the present invention, because, on the hemispherical concave surface of the ball supporting member, in addition to the primary small balls contacting the large ball, auxiliary small balls that are smaller than the primary small balls are provided, the primary small balls are not limited in contacting each other, and a state may occur in which the auxiliary small balls are interposed between the primary small balls. In this region, because ample gaps are provided around the primary small balls, contaminants that have penetrated inside accumulate in these gaps. Therefore, it is possible to prevent interference with the rotation of the small balls due to contaminants adhering to the small balls. In addition, it is possible to prevent interference with the rotation of the large ball due to contaminants adhering directly to the large ball or contaminants being interposed between the large ball and the small balls. Thereby, it is possible to prevent the performance as a ball bearing from degrading.

In addition, there is a possibility that contaminants may be compressed and pulverized between the primary small balls and the auxiliary small balls. However, when a hole is provided at the lowest portion of the ball supporting member, the contaminants, whose size has become small, are readily discharged to the outside through the hole, and it is thereby possible to reduce the amount of the contaminants inside. This feature also enables the prevention of degrading of the performance of the ball bearing to the highest degree.

In the ball bearing described above, preferably, the ball supporting member has a through-hole for discharging the contaminants at the lowest portion thereof.

In the ball bearing described above, when the diameter of the primary small balls is represented by "D", the diameter of the auxiliary small balls is preferably in a range of 0.6 D to 0.95 D, and more preferably, in a range of 0.7 D to 0.85 D.

In the ball bearings described above, when the number of primary small balls is represented by "N", the number of auxiliary small balls is preferably in a range of 0.2 N to 0.4 N, and more preferably, in a range of 0.25 N to 0.35 N.

DETAILED DESCRIPTION OF THE INVENTION

Below, a ball bearing embodying the present invention will be explained with reference to the drawings.

Figure 1:
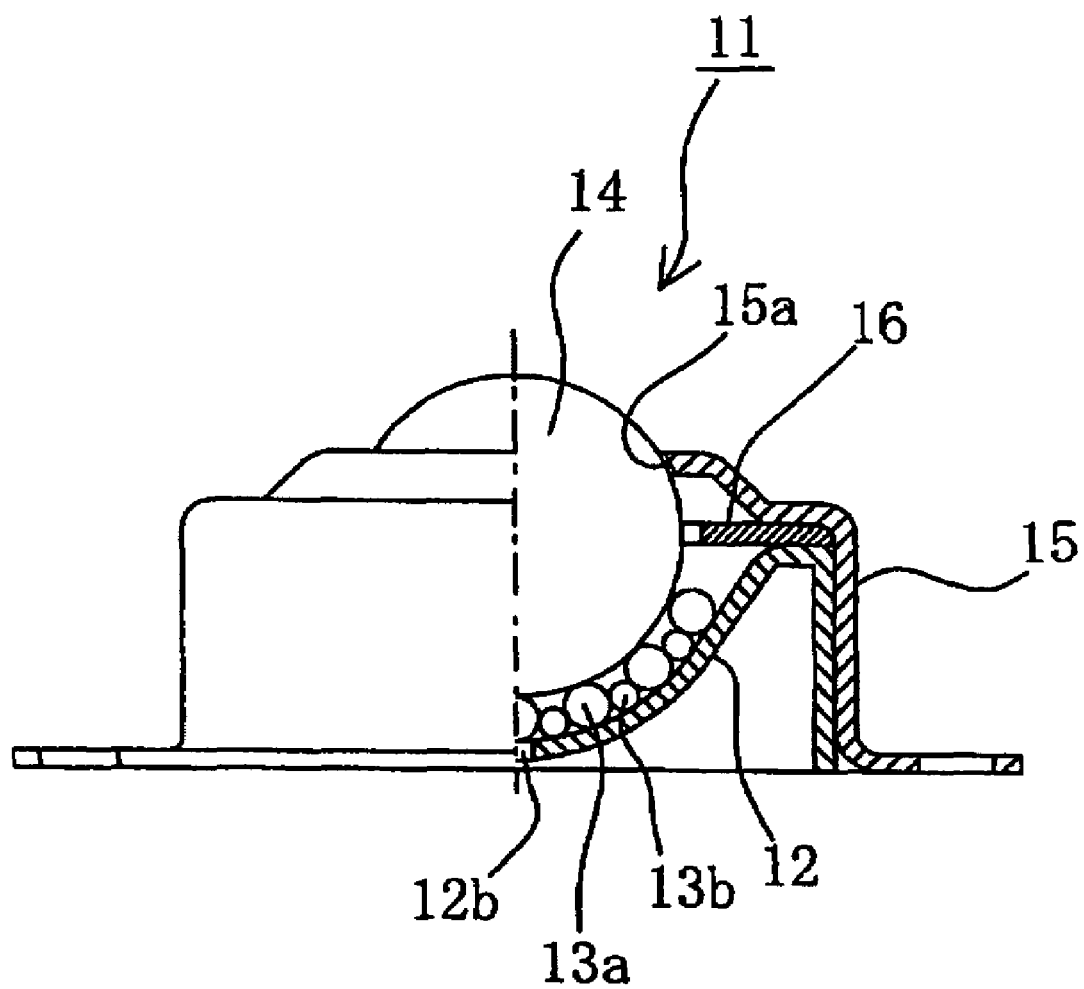
FIG. 1 is a partially cut-away drawing showing the ball bearing in an embodiment of the present invention from a front view and a cross-sectional view.
Figure 2:
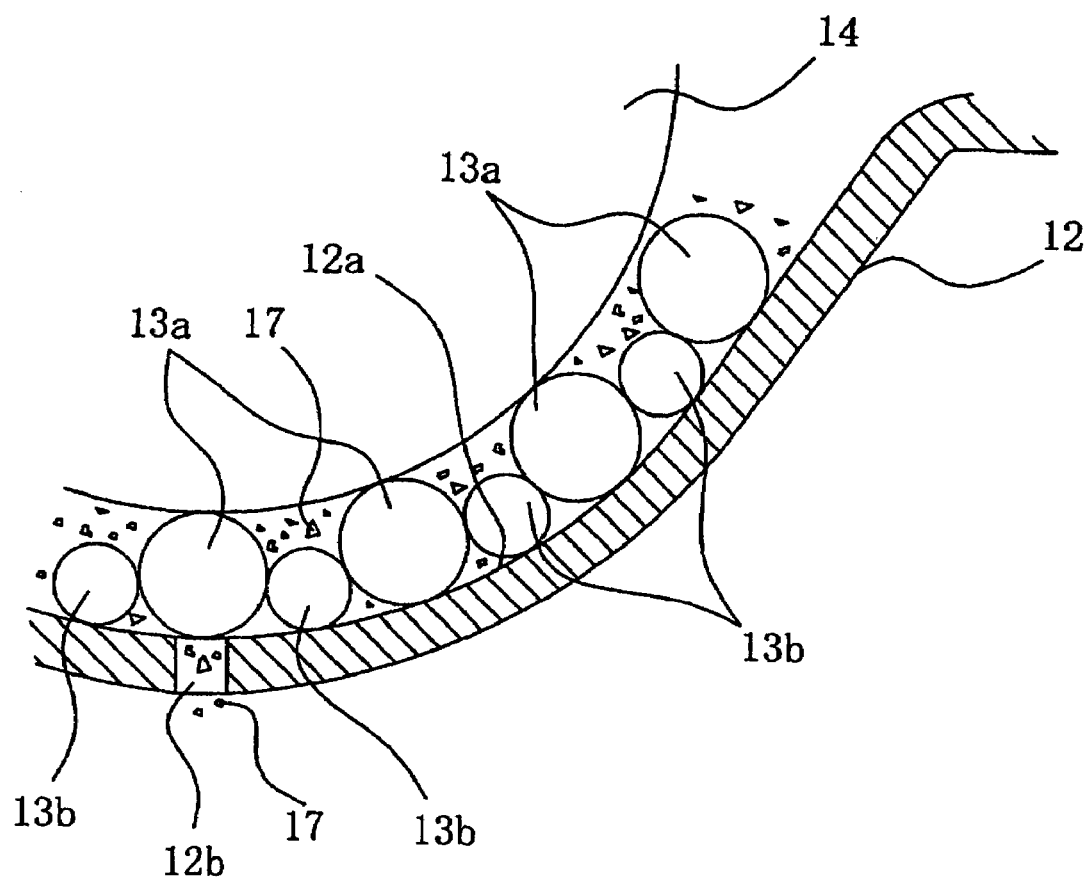
FIG. 2 is a drawing for explaining the operation of the ball bearing in FIG. 1, and is an enlarged drawing of the primary portion of FIG. 1.

FIG. 1 is a partially cut-away drawing showing a ball bearing 11 of an embodiment of the present invention from a front view and a cross-sectional view. FIG. 2 is an enlarged drawing of the primary portion of FIG. 1. As shown in these figures, in the ball bearing 11, a ball supporting member 12 has a hemispherical concave surface 12a, and a plurality of primary small balls 13a and auxiliary small balls 13b which are freely arranged on the hemispherical concave surface 12a. In addition, one large ball 14 is seated thereon, and the large ball 14 is retained so as to be rotatable in all directions. All of these components are accommodated in a casing 15, which has an aperture 15a through which the upper portion of the large ball 14 projects. In addition, in the center portion, which is the lowest portion of the ball supporting member 12, a contaminant discharge hole 12b (a through-hole) is provided. Reference numeral 16 denotes a washer.

Note that in the figures, although the primary small balls 13a and the auxiliary small balls 13b are disposed alternately, because the small balls are arranged simply by placing the plurality of small balls into the hemispherical concave surface 12a and then seating the large ball 14 thereon, the primary small balls 13a and the auxiliary small balls 13b are not limited in being arranged alternately, and the arrangement of the primary small balls 13a and the auxiliary small balls 13b is not fixed. As shown in FIGS. 1 and 2, the primary small balls 13a and auxiliary small balls 13b are disposed in the space between the large ball 14, the casing 15, and the hemispherical concave surface 12a. The number of primary small balls 13a and auxiliary small balls 13b is selected so that there is a gap in the upper part of this space, i.e., just below the washer 16 as shown in FIGS. 1 and 2. The presence of the gap within the interior space allows the arrangement of the primary small balls 13a and auxiliary small balls 13b to not be fixed. Instead, the pattern of or the arrangement formed by the primary small balls 13a and auxiliary small balls 13b is mutable. However, if the number of auxiliary small balls 13b is equal to or greater than a certain proportion of the number of primary small balls 13a, then an arrangement may occur in which an auxiliary small ball 13b is interposed between one primary small ball 13a and another primary small ball 13a.

In the ball bearing 11 described above, in addition to the primary small balls 13a contacting the large ball 14, the auxiliary small balls 13b, which are smaller than these primary small balls 13a, are present on the hemispherical concave surface 12a of the ball supporting member 12. Thus, as is also shown in the enlargement in FIG. 2, states occur in which the auxiliary small balls 13b become interposed between the primary small balls 13a. In this region, because ample gaps are provided around the primary small balls 13a, contaminants (denoted by reference numeral 17) that have penetrated inside accumulate in the gaps. Therefore, it is possible to prevent interference with the rotation of the primary small balls 13a due to contaminants adhering in particular to the primary small balls 13a. In addition, it is possible to prevent interference with the rotation of the large ball 14 due to contaminants adhering directly to the large ball 14 or contaminants becoming interposed between the large ball 14 and the primary small balls 13a. Thereby, it is possible to prevent the performance as a ball bearing from degrading.

In addition, there is a possibility that contaminants may be compressed and pulverized by the primary small balls 13a and the auxiliary small balls 13b. However, because the hole 12b is provided at the lowest portion of the ball supporting member 12, the contaminants 17 that have become smaller are readily discharged through the hole 12b to the outside, and it is thereby possible to reduce the amount of contaminants therein. This feature also enables the prevention of degrading of the performance of the ball bearing to the highest degree.

Figure 3:
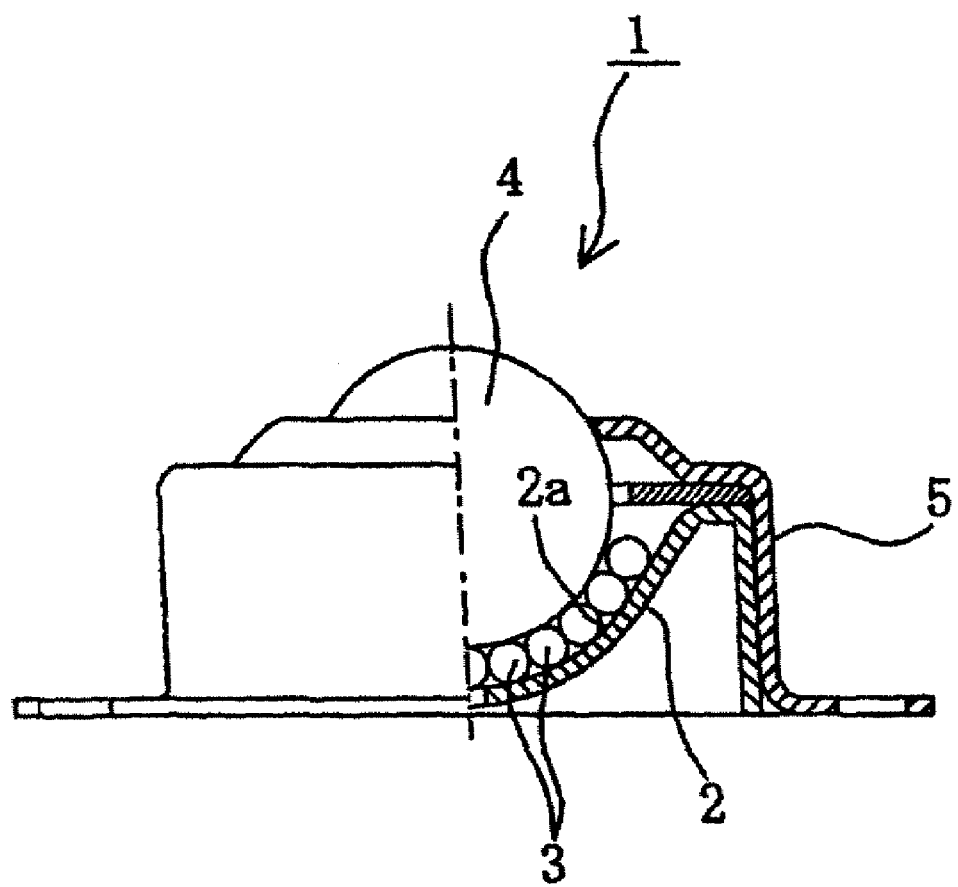
FIG. 3 is a partially cut-away drawing showing a conventional ball bearing from a front view and a cross-sectional view.

In addition, in a case as in the conventional ball bearing 1 shown in FIG. 3, in which all of the small balls 4 have an identical diameter, and the small balls 4 having an identical diameter come into direct contact with each other, at least two adjacent small balls 3 rotate in opposite directions. Thus, at least one of the small balls 3 has a direction of rotation that is opposite to the direction of rotation of the large ball 3, and resists the rotation of the large ball 4. In contrast, in the case of the ball bearing 11 of the present invention, a condition occurs in which, at least to a certain extent, two primary small balls 13a contacting the large ball 14 contact each other indirectly due to a small-diameter auxiliary small ball 13b becoming interposed. Thus, in this case, the directions of rotation of two primary small balls 13a contacting the large ball 14 are identical directions, and these two primary small balls 13a rotate in accordance with the direction of rotation of the large ball 14 (i.e., do not hinder the rotation of the large ball 14). Therefore, this contributes, to some extent, to the smooth rotation of the large ball 14.

Note that while the diameter of the auxiliary small balls 13b with respect to the primary small balls 13a may be set depending on various conditions, when the diameter of the primary small balls 13a is represented by "D", the diameter of the auxiliary small balls 13b is preferably in a range of 0.6 D to 0.95 D, and more preferably, in a range of 0.7 D to 0.85 D.

In addition, while the ratio of the number of auxiliary small balls 13b to the number of primary small balls 13a may also be set depending on various conditions, when the number of the primary small balls 13a is represented by "N", the number of the auxiliary small balls 13b is preferably in a range of 0.2 N to 0.4 N, and more preferably, in a range of 0.25 N to 0.35 N.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The ball bearing of the present invention may be used as a conveying apparatus that conveys materials, parts, semi-finished products, finished products, and other such products at a production facility.

According to the present invention, it is possible to advantageously prevent degrading of the performance of the ball bearing.

What is claimed is:

1. A ball bearing comprising:
a ball supporting member having a hemispherical concave surface;
primary small balls disposed so as to be movable in all directions on the hemispherical concave surface;
a large ball disposed on the primary small balls so as to be rotatable in all directions;
auxiliary small balls which are smaller than the primary small balls and are disposed so as to be movable in all directions on the hemispherical concave surface so as not to contact the large ball; and
a casing having an aperture through which an upper portion of the large ball projects, and accommodating the ball supporting member, the primary small balls, the auxiliary small balls, and the large ball;
wherein the primary small balls and the auxiliary small balls are disposed in the internal space surrounded by the large ball, the casing, and the hemispherical concave surface and the number of primary small balls and auxiliary small balls is selected so as to leave a gap at an upper part of the internal space that is at least as large as a primary small ball.

2. A ball bearing according to claim 1, wherein the ball supporting member has a through-hole at a lowest portion thereof.

3. A ball bearing according to claim 1, wherein, when a diameter of the primary small balls is represented by "D", a diameter of the auxiliary small balls is in a range of 0.6 D to 0.95 D.

4. A ball bearing according to claim 1, wherein, when a number of primary small balls is represented by "N", a number of auxiliary small balls is in a range of 0.2 N to 0.4 N.

5. A ball bearing according to claim 1, wherein a relative positional relationship of the primary small balls and the auxiliary small balls are mutable.

* * * * *